(12) United States Patent
Higgins

(10) Patent No.: US 12,056,053 B2
(45) Date of Patent: *Aug. 6, 2024

(54) METHOD AND SYSTEM FOR ESTABLISHING A DISTRIBUTED NETWORK WITHOUT A CENTRALIZED DIRECTORY

(71) Applicant: Mastercard International Incorporated, Purchase, NY (US)

(72) Inventor: Stephen Higgins, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,381

(22) Filed: Apr. 17, 2023

(65) Prior Publication Data

US 2023/0251969 A1    Aug. 10, 2023

Related U.S. Application Data

(63) Continuation of application No. 17/193,375, filed on Mar. 5, 2021, now Pat. No. 11,650,921.

(51) Int. Cl.
*G06F 12/0817* (2016.01)
*G06F 12/0893* (2016.01)
*G06F 16/901* (2019.01)
*H04L 45/02* (2022.01)
*H04L 61/00* (2022.01)

(52) U.S. Cl.
CPC ...... *G06F 12/0824* (2013.01); *G06F 12/0893* (2013.01); *G06F 16/9017* (2019.01); *H04L 61/00* (2013.01); *H04L 45/02* (2013.01)

(58) Field of Classification Search
CPC ............. G06F 12/0824; G06F 12/0893; G06F 16/9017; H04L 61/00; H04L 45/02
USPC ........................................................ 711/141
See application file for complete search history.

(56) References Cited

U.S. PATENT DOCUMENTS

| | | |
|---|---|---|
| 2003/0050980 A1 | 3/2003 | Dutta et al. |
| 2006/0239197 A1 | 10/2006 | Lieuallen et al. |
| 2011/0026434 A1 | 2/2011 | Van Der Stok et al. |
| 2015/0326440 A1 | 11/2015 | Smith et al. |
| 2017/0148016 A1 | 5/2017 | Davis |
| 2017/0311226 A1 | 10/2017 | Fuhrmann |

(Continued)

OTHER PUBLICATIONS

GoQuorum, Private Transaction Lifecycle, retrieved on Mar. 4, 2021, 4 pages, https://docs.goquorum.consensys.net/en/stable/Concepts/Privacy/PrivateTransactionlifecycle/.

(Continued)

*Primary Examiner* — James E Springer
(74) *Attorney, Agent, or Firm* — Panitch Schwarze Belisario & Nadel LLP

(57) ABSTRACT

A method for establishing a connection between two nodes in a communication network without use of a centralized directory or mapping identifiers includes: receiving a lookup message from another node in the communication network that includes a lookup term; determining if a target node in a local directory cache can be identified that satisfies the lookup term; and, if such a node is identified, establishing a connection to the target node and forwarding the lookup message, or, if no such node is identified, forwarding the lookup message to other nodes in the network with which the node has an active communication connection.

16 Claims, 5 Drawing Sheets

(56) References Cited

U.S. PATENT DOCUMENTS

2018/0053182 A1    2/2018  Mokhasi
2020/0169857 A1    5/2020  Yang et al.
2020/0389394 A1   12/2020  Wijnands et al.

OTHER PUBLICATIONS

Notification of Transmittal of the International Search Report (Forms PCT/ISA/220 and PCT/ISA/210) and the Written Opinion of the International Searching Authority (Form PCT/ISA/237), issued May 18, 2022, by the International Application Division Korean Intellectual Property Office in corresponding International Application No. PCT/US2022/015967, 10 pps.

METHOD AND SYSTEM FOR ESTABLISHING A DISTRIBUTED NETWORK WITHOUT A CENTRALIZED DIRECTORY

FIELD

The present disclosure relates to establishing a connection between two nodes in a communication network without use of a centralized directory or mapping identifiers, specifically the use of lookup messages and specialized values to enable a node in a distributed communication network to find another without the use of a centralized directory.

BACKGROUND

Communication networks can utilize a variety of different topologies and architectures. Some topologies including having centralized nodes that communicate with a vast number of other nodes, enabling easy communications across the network through these centralized nodes. Other topologies, such as mesh networks, are set up through a web of connections, where each node may be connected to only a handful of other nodes, but where there is always an unbroken path from any one node to any other. Often times, these types of networks utilize centralized directories, where address or other communication data can be stored for every node in the network. Thus, when a first node needs to contact a second node, they can identify how in the directory and then carry out the communication. See, US Pub. Pat. Appl. No. 2017/0148016A1 or Quorum (https://docs.goquorum.consensys.net/en/stable/Concepts/Privacy/PrivateTransaction Lifecycle/), where transactions between parties may be conducted off-chain with a hash reference to the final agreement and/or commitment distributed on-chain in a blockchain node environment. To be able to do this, nodes on the network acting on behalf of chain participants need to connect directly to exchange transaction data for which, in turn, support for routing of transient point-to-point connections is required.

However, distributed communication networks do not utilize centralized directories. For example, blockchain networks operate using a plurality of nodes that communicate with other nodes, but without any central directory. In many instances, a centralized directory may be impossible or impractical depending on the architecture of the network and the number of nodes. Additionally, if one particular node wants to communicate with another particular node, there may no explicit ability to do so in the communication network itself. Instead, the node can simply broadcast a message, or may use an alternative communication method to retrieve an address or other data for the other node. Such methods can be very inefficient and, in some cases, unavailable. Thus, there is a need for technology in a distributed communication network that can enable a first node to locate a second node in the network without the use of a centralized directory.

SUMMARY

The present disclosure provides a description of systems and methods for establishing a connection between two nodes in a communication network without requiring the use of a centralized directory. When an originating node needs to connect with a target node, they can send a lookup message to any connected nodes, referred to herein as intermediary nodes, where the lookup message includes a term that may only be satisfied by the proper target node. When a node receives the message, they can check to see if they satisfy the lookup term, which would make them the target, and then connect back to the originating node using an address in the lookup message. If they are not the target, the intermediary node can check a cached directory to see if they know the target node. If so, they can forward the lookup message directly to the target node, which can then connect back to the originating node. If the intermediary node does not know the target node, they can forward on the message to their own peers, which can continue the process. The result is that the message is distributed out through the network to reach the target in the most efficient manner possible, with each intermediary having no knowledge of the purpose of the connection or, in many cases, the identity of the target itself, as only the target may be able to satisfy the lookup term. Thus, security and privacy can be maintained in a distributed network while also enabling any two nodes to connect in an efficient manner.

A method for establishing a connection between two nodes in a communication network without use of a centralized directory or mapping identifiers includes: storing, in a memory of an intermediary node in a communication network, a directory cache comprised of a plurality of directory entries, where each directory entry includes a response term, a communication address, a timestamp, and an entry time-to-live value; receiving, by a receiver of the intermediary node, a lookup message from an originating node, where the lookup message includes at least a lookup term, a network address of the originating node, and a lookup time-to-live value; determining, by a processor of the intermediary node, if a specific entry in the directory cache stored in the intermediary node includes a response term that satisfies the lookup term; and if the processor determines that a specific entry includes a response term that satisfies the lookup term, establishing, by the intermediary node, a communication channel with a target node in the communication network using the communication address included in the specific entry, and forwarding, by a transmitter of the intermediary node, the lookup message to the target node using the established communication channel, or if the processor determines that no specific entry in the directory cache includes a response term that satisfies the lookup term, forwarding, by the transmitter of the intermediary node, the lookup message to a plurality of connected nodes with active communication connections to the intermediary node in the communication network.

A system for establishing a connection between two nodes in a communication network without use of a centralized directory or mapping identifiers includes: a communication network; an originating node in the communication network; a plurality of additional nodes in the communication network; a target node in the communication network; and an intermediary node in the communication network, the intermediary node including a memory storing a directory cache comprised of a plurality of directory entries, where each directory entry includes a response term, a communication address, a timestamp, and an entry time-to-live value, a receiver receiving a lookup message from an originating node, where the lookup message includes at least a lookup term, a network address of the originating node, and a lookup time-to-live value, a transmitter, and a processor determining if a specific entry in the directory cache stored in the intermediary node includes a response term that satisfies the lookup term, wherein if the processor determines that a specific entry includes a response term that satisfies the lookup term, the processor establishes a communication channel with a target node in the communication network using the communication address included in the specific entry, and the transmitter forwards the lookup message to the target node using the established communication channel, or if the processor determines that no specific entry in the directory cache includes a response term that satisfies the lookup term, the transmitter forwards the lookup message to a plurality of connected nodes with active communication connections to the intermediary node in the communication network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Establishing Connections in a Communication Network

Figure 1:
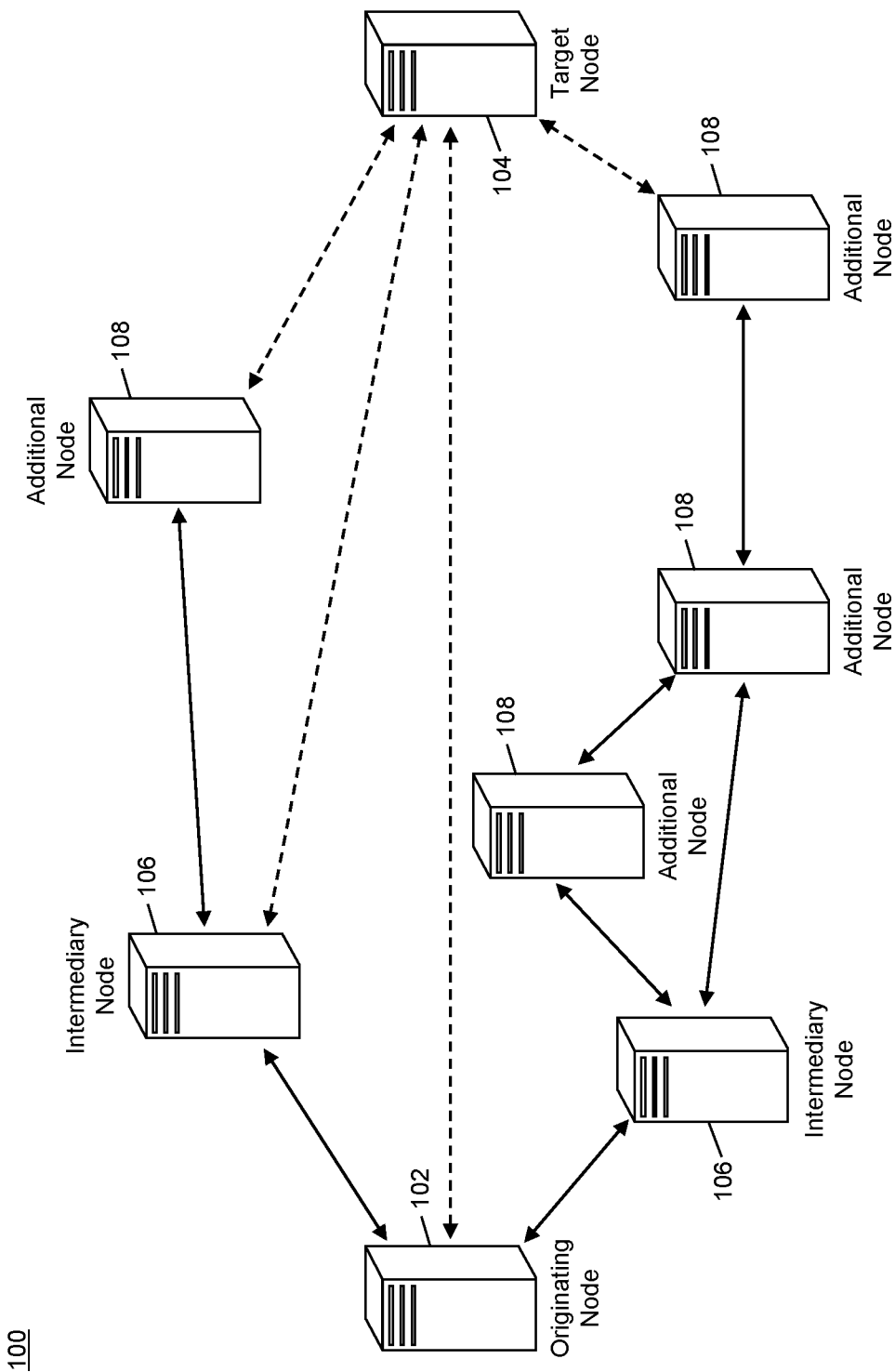
FIG. 1 is a block diagram illustrating a high-level system architecture for establishing a connection between nodes in a distributed communication network in accordance with exemplary embodiments.
Figure 2:
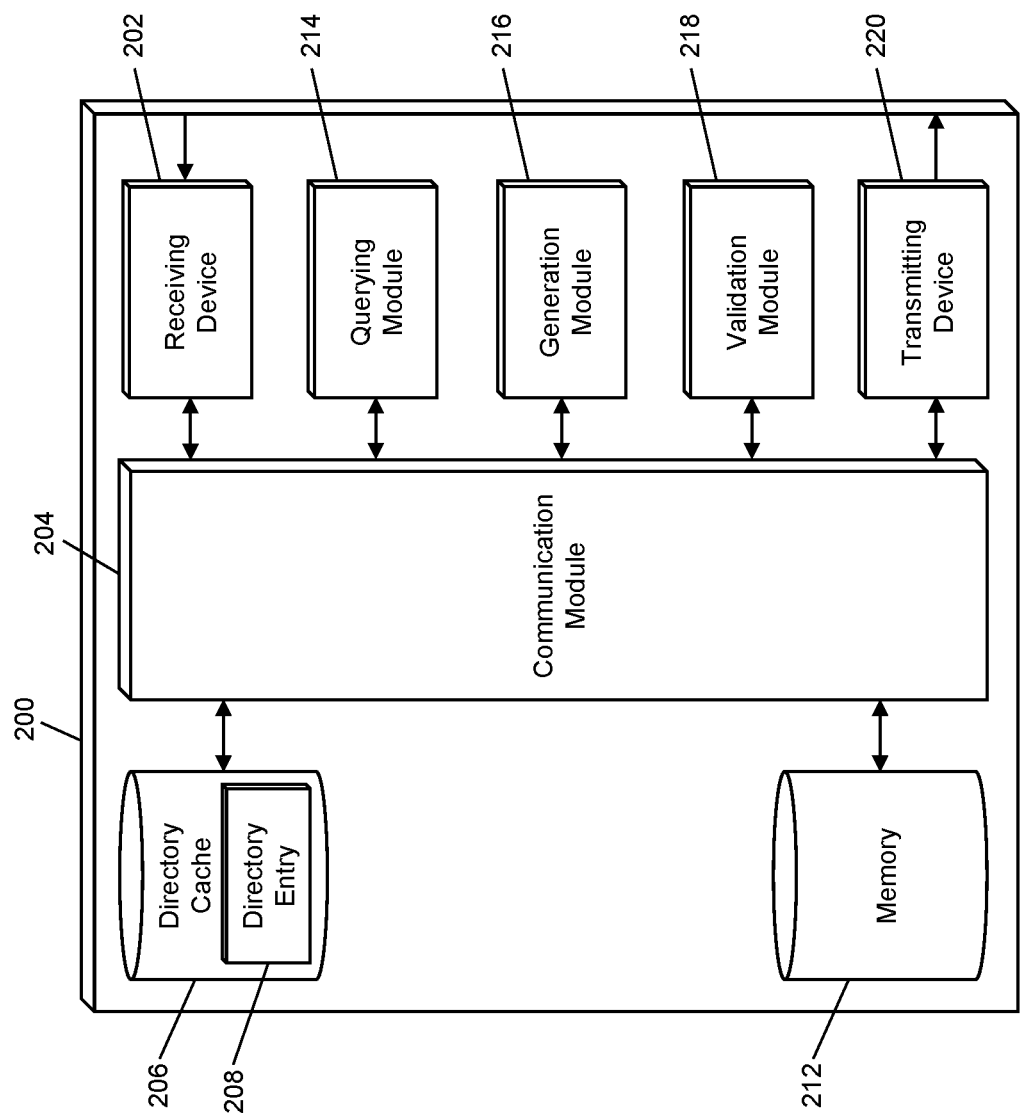
FIG. 2 is a block diagram illustrating a communication node of the system of FIG. 1 for in accordance with exemplary embodiments.

FIG. 1 illustrates a communication network 100 that includes a plurality of computing nodes. In an exemplary embodiment, the communication network 100 may be a distributed network that lacks a centralized directory, where each computing node may be in communication with one or more other computing nodes in the communication network 100, but where there is no centralized node to facilitate communications and no central directory of member nodes and their network addresses. Each of the computing nodes may be a specially configured computing device, such as illustrated in FIG. 2 and described in detail below, that is configured to perform the functions discussed herein for facilitating the connection of two nodes in the communication network 100.

In the communication network 100, an originating node 102 may want to establish a connection with a target node 104. In an example, the communication network 100 may be a blockchain network used for electronic payments, where the originating node 102 may be a first business that wants to transact with a target node 104 as a second business. The originating node 102 may have identifying information for the target node 104 but may be unaware of the network address for the target node 104 in the communication network 100. For example, the originating node 102 may be a first bank that knows it needs to make a payment to a second bank, and knows of the second bank, but not know how to contact the second bank to arrange for the payment or get additional information.

In order to connect to the target node 104, the originating node 102 may transmit a lookup message to every node connected thereto. The lookup message may include a lookup term, a network address for the originating node 102, and a time-to-live (TTL) value. The TTL value may be an expiration time for the message, such as to prevent the identification of long communication paths and stop the process if the target node 104 is not successfully identified. In some instances, the TTL value may be represented as a timestamp (e.g., five minutes after the time at which the response message is generated). In other instances, the TTL value may be a time value itself (e.g., 300 seconds). In some embodiments, the lookup message may also include a value that indicates to any node in receipt of the lookup message that the message pertains to a lookup function, as discussed herein.

The lookup term may be an identification value or other item of data that may be recognizable as associated with the target node 104, such as a name or identification number thereof, or may be recognizable by the target node 104 as the target thereof. For instance, the lookup term may be a hashed value, where the target node 104 may be aware of the underlying value and may hash the underlying value, which may result in the lookup term and thus indicate to the target node 104 that they are in the target. In the above example, the lookup term may be a hashed or encrypted transaction account number, where the target node 104 would be able to identify the transaction account number and, in some instances, validate that the transaction account is issued by that bank. In some cases, the lookup message may include additional data to be used to determine if a node is the target node 104 for the lookup message. For example, the lookup message may include a data value, such as a random word, that must be hashed by the target node 104 and, if the result is the same as the lookup term, the target node 104 will know they are the target.

If the originating node 102 is directly connected to the target node 104 (e.g., and may be unaware that a node in connection therewith is their target), the lookup message may be sent directly to the target node 104. The target node 104 may receive the lookup message and may, from the lookup term, identify itself as the target, as discussed in more detail below. The lookup message may also be transmitted to any other nodes connected to the originating node 102, such as the intermediary nodes 106 illustrated in FIG. 1. Each intermediary node 106 may receive the lookup message and may determine that it is not the target of the lookup message (e.g., due to the lookup term referring to a different node, or other inability to satisfy the lookup term).

The intermediary node 106 may then query a directory cache stored in the intermediary node 106 to determine if it knows the target node 104. The directory cache may be a cache of directory entries stored in each node in the communication network 100 that includes address information for other nodes, response terms for the nodes, and timestamps for each node. The address information may be the latest communication address received for that node in the communication network 100. The timestamp may be a time at which the communication address was received by the node. The response term may be an identification value or other data that may satisfy a lookup term if the associated node is the target for a lookup message. For example, if each node in the communication system 100 has a proper name, the response terms in the directory cache may be the proper name. The directory cache may be updated any time any of the information is received by a node. For instance, when an intermediary node 106 receives the lookup message, it may update the directory cache to include an entry for the originating node 102 that includes the network address and lookup term from the lookup message, as well as a timestamp for the present time or the TTL in the lookup message.

The intermediary node 106 may use the directory cache to determine if the intermediary node 106 knows any other node that may be the target node 104 where the response term satisfies the lookup term. For example, the lookup term may be an encrypted value, where the response terms are public keys unique to the associated nodes. In such an example, successful decryption of the value using a public key may satisfy the lookup term and indicate the associated node as the target node 104. In some cases where the response term may be an encrypted value, the value may only be decrypted by the target node 104 (e.g., the value may be encrypted using a public key of a cryptographic key pair for which only the target node 104 has the private key). In such cases, the intermediary node 106 may never be able to identify the target node 104 unless the intermediary node 106 is also the target node 104.

If the intermediary node 106 is able to identify that it knows the identity of the target node 104, the intermediary node 106 may establish a communication channel with the target node 104 using the communication information included in the directory cache. The intermediary node 106 may then forward the lookup message to the target node 102 using the established communication channel. If the intermediary node 106 does not identify the target node 104b, the intermediary node 106 may forward the lookup message to any additional nodes 108 that it has an active communication channel within the communication network 100. Those additional nodes 108 may then process the lookup message similarly: determine if the node itself is the target node 104, determining if it knows the target node 104 and forwarding the lookup message thereto, or forwarding the lookup message to any further additional nodes 108 in connection therewith.

In some embodiments, the TTL value in the lookup message may be decremented or otherwise processed by an intermediary node 106 or additional node 108 prior to forwarding. For instance, if the TTL value is an expiration time, the lookup message may only continue to be forwarded on until the expiration time has passed. If the TTL value is a time value, the time may be decremented by the amount of time it takes for the intermediary node 106 or additional node 108 to forward the lookup message from the time of receipt. For example, if it takes the intermediary node 106 twenty seconds to attempt to satisfy the lookup term (e.g., check if the node itself is the target) and to attempt to identify the target node 104 in its directory cache, the intermediary node 106 may decrement the TTL value by twenty seconds before forwarding to additional nodes 108.

Once the target node 104 has received the lookup message, such as by identifying a response term that satisfies the lookup term, the target node 104 may establish a communication channel with the originating node 102 using the network address from the lookup message. In some cases, the response term may be provided during the establishing of the communication channel, such as to prove to the originating node 102 that the target node 104 is the target. In other cases, the communication channel may be opened with the originating node 102 first, and the response term exchanged using the communication channel. The response term may be validated by the originating node 102, such as to ensure that the target node 104 is the intended target (e.g., and not an imposter). For instance, in the bank example, the response term may be proof that the second bank issued the transaction account that matches the transaction account number in the lookup message. In another example, the response term may be the decrypted lookup term that was decrypted using the target node's private key. If the response term is validated, then the originating node 102 and target node 104 can exchange any communications as desired.

In some embodiments, a response message may be transmitted by the target node 104 back through the other nodes in the communication network 100. For example, the target node 104 may generate a response message that includes the response term, a new TTL value, and the address at which the target node 104 may be contacted by the originating node 102. In some cases, the response message may also include the value identifying the lookup operation or a response operation, the network address for the originating node 102, and/or the lookup term. The response message may then be forwarded on through the additional nodes 108 and/or intermediary nodes 106 back to the originating node 102. In such cases, the originating node 102 may initiate the communication channel with the target node 104 using the address provided in the response message. In these embodiments, each node that receives a response message may update their directory cache to insert or update entries for the target node 104 to include the new TTL value in the response message, the network address, and the response term, and the timestamp, as applicable.

In some embodiments, a node may further include a lookup cache, which may be in addition to, separate from, or included in as part of the directory cache. In such embodiments, the lookup cache may be used by the node to store entries for lookup messages transmitted to other nodes (e.g., the originating node 102 may store an entry in its lookup cache for the lookup messages transmitted thereby). The lookup cache may be used by a node to detect when a received lookup message is its own lookup message, such as by a comparison of the lookup term included therein and/or other data. In such cases, the node may discard the received lookup message after it determines it was sent by itself (e.g., based on finding a matching entry in the lookup cache) and may thus not expend resources and processing of the received lookup message. In these instances, potentially disruptive loops of messages can be avoided by checking a lookup cache prior to processing of a received lookup message as discussed above. In some cases, the directory cache may be used as the lookup cache, where an entry may have an additional flag or other data value used to indicate that the node was the originator of that lookup message.

The methods and systems discussed herein enable an originating node 102 to locate and establish a communication channel with a target node 104 in a communication network 100 without the use of a centralized directory. In addition to not using a centralized directory, the communication network 100 does not need any mapping identifiers. In cases where lookup terms and response terms utilize encryption, hashing, or other cryptographic techniques, no node may be able to directly identify any other node, maintaining fully security and anonymity in the network. In these cases, a lookup message can be transmitted through the communication network 100 and may only be used by the proper target node 104, enabling a fast, efficient, and still secure connecting of the originating node 102 with a target node 104. Thus, the methods and systems discussed herein maintain all of the advantages of a decentralized, distributed network with the communication capabilities of a traditional, centralized network.

Computing Node

FIG. 2 illustrates an embodiment of the computing node 200, which may be the originating node 102, target node 104, intermediary node 106, and/or additional node 108 in the communication network 100 of FIG. 1. It will be apparent to persons having skill in the relevant art that the embodiment of the computing node 200 illustrated in FIG. 2 is provided as illustration only and may not be exhaustive to all possible configurations of the computing node 200 suitable for performing the functions as discussed herein. For example, the computer system 500 illustrated in FIG. 5 and discussed in more detail below may be a suitable configuration of the computing node 200, which may perform any functions of any of the nodes discussed herein.

The computing node 200 may include a receiving device 202. The receiving device 202 may be configured to receive data over one or more networks via one or more network protocols. In some instances, the receiving device 202 may be configured to receive data from other computing nodes 200, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other computing nodes 200 that may be superimposed or otherwise encoded with lookup messages, response messages, and other data used in the establishing and operation of communication channels in the communication network 100. Lookup messages and response messages may include network addresses, lookup or response terms, identification values indicating operations to be performed, TTL values, and other data as discussed herein.

The computing node 200 may also include a communication module 204. The communication module 204 may be configured to transmit data between modules, engines, databases, memories, and other components of the computing node 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing node 200 and external components of the computing node 200, such as externally connected databases, display devices, input devices, etc. The computing node 200 may also include a processing device. The processing device may be configured to perform the functions of the computing node 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software executed on hardware or hardware particularly programmed to receive an input, perform one or more processes using the input, and provides an output. The input, output, and processes performed by various modules will be apparent to one skilled in the art based upon the present disclosure.

The computing system 200 may include a directory cache 206. The directory cache 206 may be configured to store a plurality of directory entries 208 using a suitable data storage format and schema. The directory cache 206 may be a relational database that utilizes structured query language for the storage, identification, modifying, updating, accessing, etc. of structured data sets stored therein. Each directory entries 208 may be a structured data set configured to store data related to another computing node 200 in the communication network 100. A directory entry 208 may include one or more terms associated with the related computing node 200, such as lookup terms and/or response terms, the latest network address received for the related computing node 200, a time at which the latest network address was received, and a TTL value. Such data may be parsed from lookup messages and/or response messages received by the computing node 200.

The computing node 200 may also include a memory 212. The memory 212 may be configured to store data for use by the computing node 200 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the computing node 200 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, the directory cache 206, hashing algorithms, encryption algorithms, communication channel data, etc.

The computing node 200 may include a querying module 214. The querying module 214 may be configured to execute queries on databases to identify information. The querying module 214 may receive one or more data values or query strings and may execute a query string based thereon on an indicated database, such as the directory cache 206 of the computing node 200 to identify information stored therein. The querying module 214 may then output the identified information to an appropriate engine or module of the computing node 200 as necessary. The querying module 214 may, for example, execute a query on the directory cache 206 to identify a directory entry 208 that includes a response term that satisfies a lookup term, for forwarding of a received lookup message to a network address included therein.

The computing node 200 may also include a generation module 216. The generation module 216 may be configured to generate data for use by the computing node 200 in performing the functions discussed herein. The generation module 216 may receive instructions as input, may generate data based on the instructions, and may output the generated data to one or more modules of the computing node 200. For example, the generation module 216 may be configured to generate response terms, new response messages, lookup terms, new lookup messages, communication channels, etc.

The computing node 200 may also include a validation module 218. The validation module 218 may be configured to perform validations for the computing node 200 as part of the functions discussed herein. The validation module 218 may receive instructions as input, which may also include data to be used in performing a validation, may perform a validation as requested, and may output a result of the validation to another module or engine of the computing node 200. The validation module 218 may, for example, be configured to validate a response term as satisfying a lookup term, where such a validation may be dependent on the lookup term and functions of the communication network 100. For instance, validation may consist of matching the terms as exact values, attempting a decryption or hash using one of the values, etc., as discussed herein.

The computing node 200 may also include a transmitting device 220. The transmitting device 220 may be configured to transmit data over one or more networks via one or more network protocols. In some instances, the transmitting device 220 may be configured to transmit data to other computing nodes 200 and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other computing nodes 200 that may be superimposed or otherwise encoded with lookup messages, response messages, and other data used in the establishing and operation of communication channels in the communication network 100. Lookup messages and response messages may include network addresses, lookup or response terms, identification values indicating operations to be performed, TTL values, and other data as discussed herein.

Process for Facilitating Communication Channels

Figure 3:
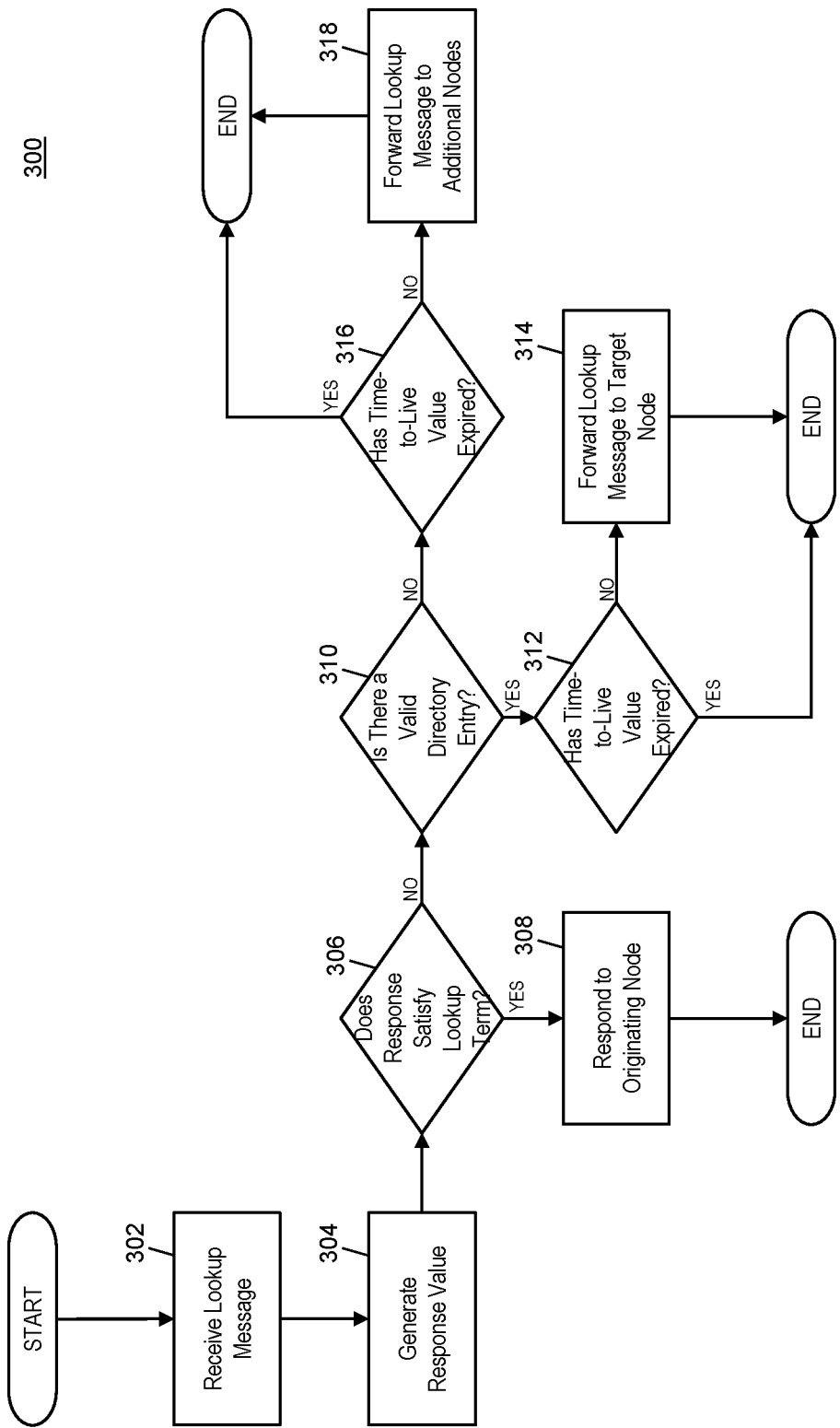
FIG. 3 is a flow diagram illustrating a process for facilitating communications in a distributed communication network without a centralized directory in accordance with exemplary embodiments.

FIG. 3 illustrates a process 300 for facilitating the establishing of a communication channel between an originating node 102 and a target node 104 in the communication network 100 of FIG. 1 by a computing node 200, such as illustrated in FIG. 2, where the computing node 200 may be the target node 104, an intermediary node 106, or an additional node 108.

In step 302, the receiving device 202 of the computing node 200 may receive a lookup message from another computing node 200 in the communication network 100. The lookup message may include at least a lookup term, network address for the originating node 102 of the lookup message, and a TTL value. In step 304, the generation module 216 of the computing node 200 may generate a response value, such as using the lookup term or other data included in the lookup message and other data that may be available to the computing node 200, such as stored in the memory 212 thereof, such as a cryptographic key. In step 306, the validation module 218 of the computing node 200 may determine if the response term matches or otherwise satisfies the lookup term.

If the response term satisfies the lookup term, then the computing node 200 is the target node 104 for the lookup message. In such cases, the process 300 may proceed to step 308, where the generation module 216 may generate a response message that includes the response term, a network address for the computing node 200, and a new TTL value. The transmitting device 220 of the computing node 200 may electronically transmit the response message directly to the originating node 102 using the address found in the lookup message, or through one or more other computing nodes 200 in the communication network 100.

If the response term does not satisfy the lookup term, then the computing node 200 is not the target node 104. In such cases, the process 300 proceeds to step 310, where the querying module 214 of the computing node 200 executes a query on the directory cache 206 of the computing node 200 to determine if there is a directory entry 208 that satisfies the lookup term. If such a directory entry 208 is found, then, in step 312, the validation module 218 may determine if the TTL value included in the directory entry 208 has expired (e.g., by checking a present time against the timestamp and TTL value in the directory entry 208). If the TTL value has not expired, then, in step 314, the transmitting device 220 of the computing node 200 may forward the lookup message to the target node 104 using communication data found in the identified directory entry 208. If the TTL value has expired (e.g., and thus the directory entry 208 expired), then the process 300 may be stopped due to expiration thereof. In some cases, the lookup message may be forwarded to any other nodes connected to the computing node 200, where such nodes may then perform the process 300 accordingly.

If, in step 310, the computing node 200 determines that there is no directory entry 208 that has a response term that satisfies the lookup term, then, in step 316, the validation module 218 may determine if the TTL value included in the lookup message has expired (e.g., by decrementing a time value thereof or checking an expiration time against a present time). If the TTL value has not expired, then, in step 318, the transmitting device 220 of the computing node 200 may forward the lookup message to any additional nodes 108 in the communication network 100 that the computing node 200 has an active connection with. If the TTL value has expired, then the process 300 may be stopped. If, before the time-to-live set for the lookup message elapses, the originating node 102 has received a valid lookup response from the target node 104 then it can either connect to it asynchronously or re-use the connection over which it receives the lookup response to perform the direct exchange of transaction data required by the application. Otherwise, the originating node 102 can consider the lookup operation to have failed and/or re-try with a larger time-to-live value, depending on the requirements of the application.

Exemplary Method for Establishing a Connection Between Two Nodes

Figure 4:
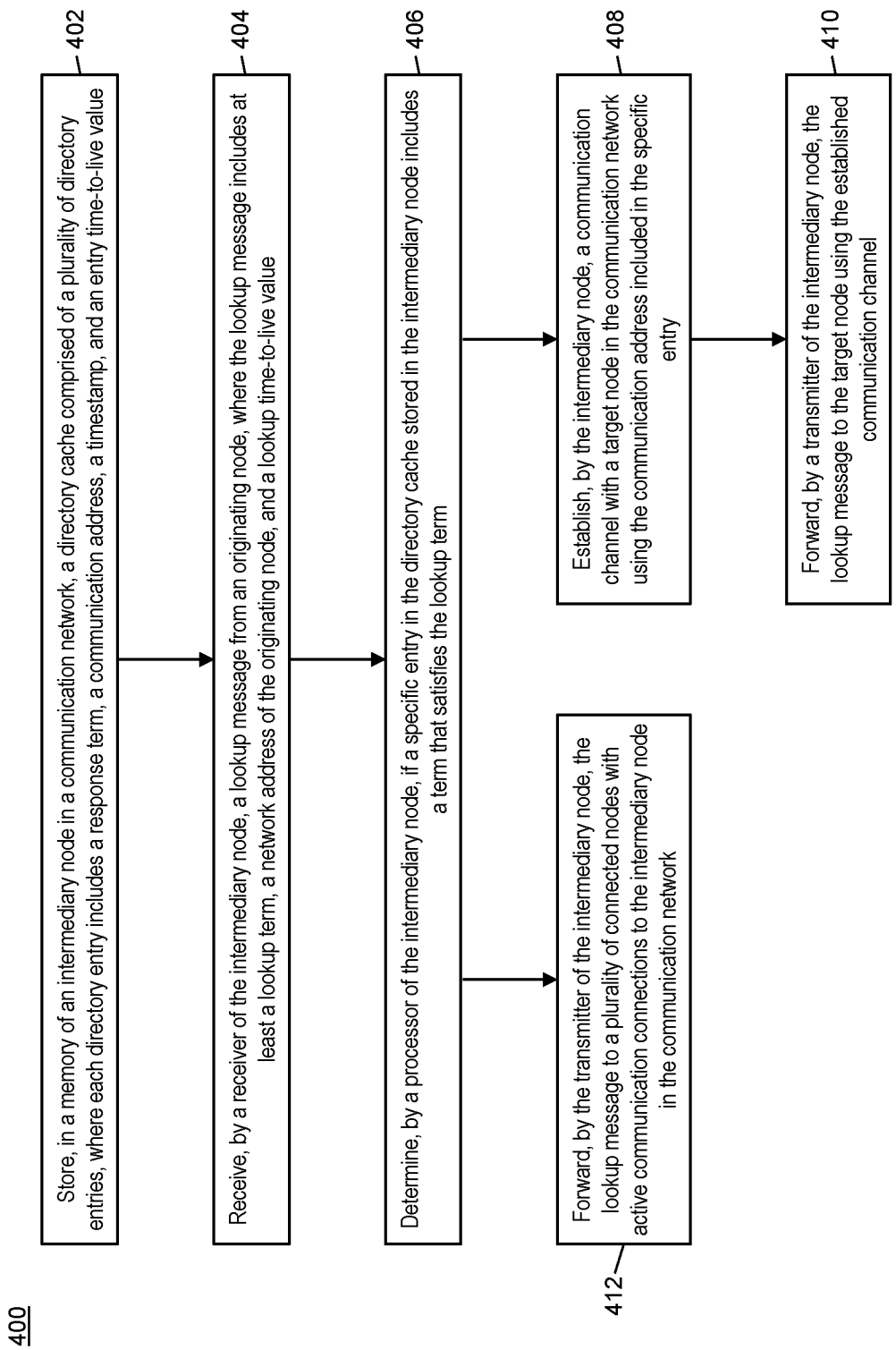
FIG. 4 is a flow chart illustrating an exemplary method for establishing a connection between two nodes in a communication network without use of a centralized directory or mapping identifiers in accordance with exemplary embodiments.

FIG. 4 illustrates a method 400 for establishing a communication channel between two nodes in a communication network without the use of a centralized directory or mapping identifiers.

In step 402, a directory cache (e.g., directory cache 206) comprised of a plurality of directory entries (e.g., directory entries 208) may be stored in a memory (e.g., memory 212) of an intermediary node (e.g., intermediary node 106, computing node 200) in a communication network (e.g., communication network 100), where each directory entry includes a response term, communication address, a timestamp, and an entry time-to-live value. In step 404, a lookup message may be received by a receiver (e.g., receiving device 202) of the intermediary node from an originating node (e.g., originating node 102, computing node 200), where the lookup message includes at least a lookup term, a network address of the originating node, and a lookup time-to-live value. In step 406, a processor (e.g., querying module 214) of the intermediary node may determine if a specific entry in the directory cache stored in the intermediary node includes a response term that satisfies the lookup term.

If the processor determines that a specific entry includes a response term that satisfies the lookup term, then, in step 408, a communication channel may be established by the intermediary node with a target node (e.g., target node 104, computing node 200) in the communication network using the communication address included in the specific entry, and, in step 410, the lookup message may be forwarded to the target node by a transmitter (e.g., transmitting device 220) of the intermediary node using the established communication channel. If, in step 406, the processor determines that no specific entry in the directory cache includes a response term that satisfies the lookup term, then, in step 412, the lookup message may be forwarded to a plurality of connected nodes (e.g., additional nodes 108, computing nodes 200) with active communication connections to the intermediary node in the communication network by the transmitter of the intermediary node.

In one embodiment, the lookup message may further include an identification value associated with a lookup operation in the communication network. In some embodiments, determining that a specific entry includes a response term that satisfies the lookup term may further include determining that a time elapsed since the timestamp included in the specific entry is less than the entry time-to-live value. In one embodiment, the lookup time-to-live value in the lookup message may be decremented prior to forwarding the lookup message based on a time elapsed since receiving the lookup message. In a further embodiment, if the decremented lookup time-to-live value is below or equal to zero, the lookup message may be discarded instead of forwarded.

In some embodiments, the method 400 may further include inserting, by the processor of the intermediary node, a new directory entry in the directory cache that includes the lookup term, the network address, and the lookup time-to-live value from the lookup message. In one embodiment, if the processor determines that no specific entry in the directory cache includes a response term that satisfies the lookup term, then the method 400 may further include: generating, by the processor of the intermediary node, a response value; determining, by the processor of the intermediary node, that the response value satisfies the lookup term; and transmitting, by the transmitter of the intermediary node, a response message to the originating node, where the response message includes the response value and an intermediary address associated with the intermediary node in the communication network. In some embodiments, the lookup message may further include a data value, the response value may be generated via hashing the data value using a predetermined key, and the response value may satisfy the lookup term by being equivalent to the lookup term.

Computer System Architecture

Figure 5:
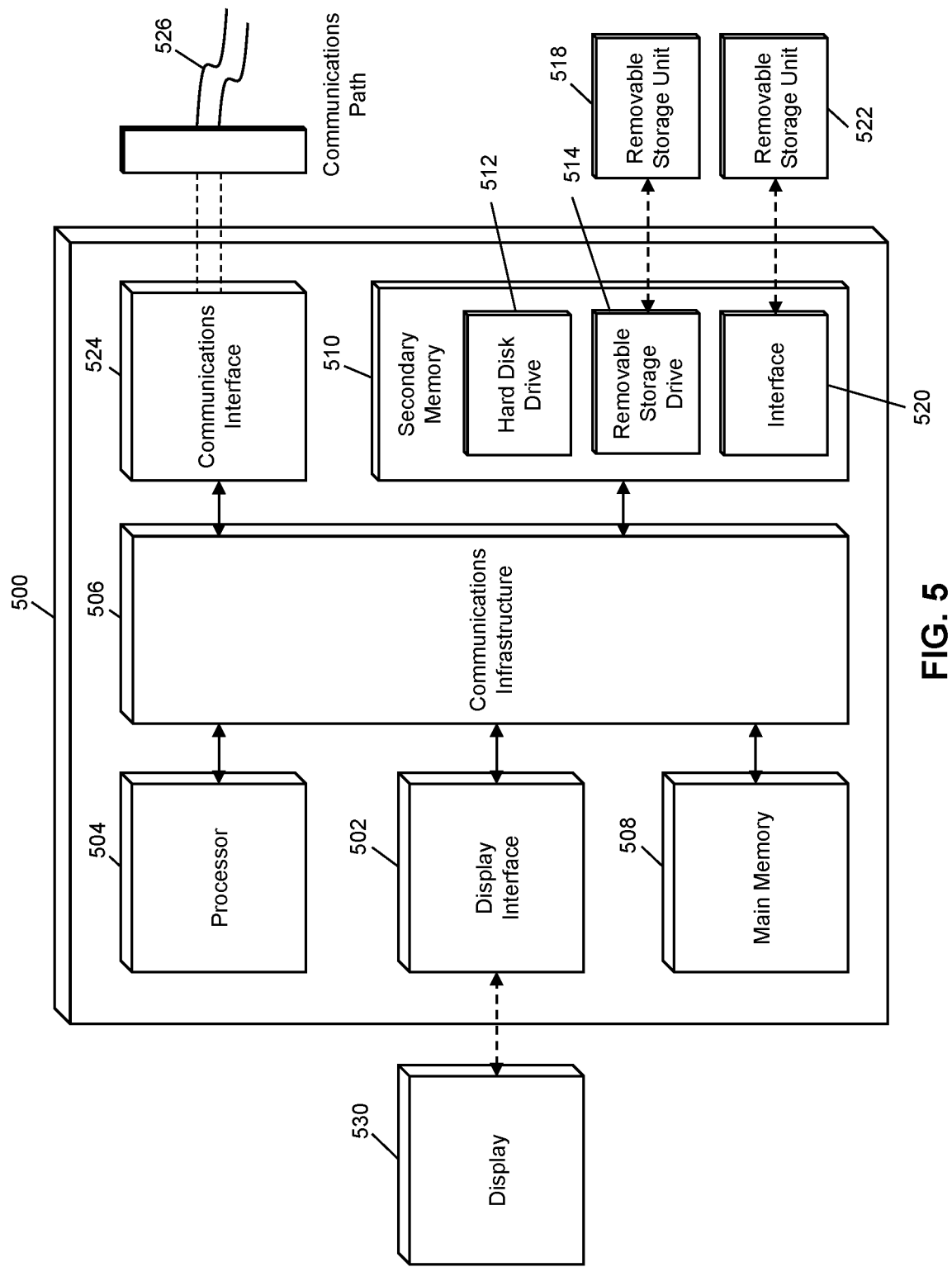
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the originating node 102, target node 104, intermediary nodes 106, and additional nodes 108 of FIG. 1 and the computing node 200 of FIG. 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for establishing a connection between two nodes in a communication network without use of a centralized directory or mapping identifiers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for establishing a connection between two nodes in a communication network, comprising:

receiving, by a receiver of an intermediary node, a lookup message from an originating node, where the lookup message includes at least a lookup term, a network address of the originating node, and a lookup time-to-live value;

determining, by a processor of the intermediary node, if a specific entry in a directory cache includes a response term that satisfies the lookup term; and if the processor determines that a specific entry includes a response term that satisfies the lookup term, forwarding, by a transmitter of the intermediary node, the lookup message to the target node using a communication channel established using a communication address in the specific entry, or if the processor determines that no specific entry in the directory cache includes a response term that satisfies the lookup term, forwarding, by the transmitter of the intermediary node, the lookup message to a plurality of connected nodes with active communication connections to the intermediary node in the communication network.

2. The method of claim 1, wherein the lookup message further includes an identification value associated with a lookup operation in the communication network.

3. The method of claim 1, wherein determining that a specific entry includes a response term that satisfies the lookup term further includes determining that a time elapsed since a timestamp included in the specific entry is less than an entry time-to-live value in the directory cache.

4. The method of claim 1, wherein the lookup time-to-live value in the lookup message is decremented prior to forwarding the lookup message based on a time elapsed since receiving the lookup message.

5. The method of claim 4, wherein, if the decremented lookup time-to-live value is below or equal to zero, the lookup message is discarded instead of forwarded.

6. The method of claim 1, further comprising:
inserting, by the processor of the intermediary node, a new directory entry in the directory cache that includes the lookup term, the network address, and the lookup time-to-live value from the lookup message.

7. The method of claim 1, wherein, if the processor determines that no specific entry in the directory cache includes a response term that satisfies the lookup term, the method further comprises:
generating, by the processor of the intermediary node, a response value;
determining, by the processor of the intermediary node, that the response value satisfies the lookup term; and
transmitting, by the transmitter of the intermediary node, a response message to the originating node, where the response message includes the response value and an intermediary address associated with the intermediary node in the communication network.

8. The method of claim 1, wherein
the lookup message further includes a data value,
the response value is generated via hashing the data value using a predetermined key, and
the response value satisfies the lookup term by being equivalent to the lookup term.

9. A system for establishing a connection between two nodes in a communication network, comprising:
an originating node in the communication network;
a plurality of additional nodes in the communication network;
a target node in the communication network; and
an intermediary node in the communication network, the intermediary node including
a receiver receiving a lookup message from the originating node, where the lookup message includes at least a lookup term, a network address of the originating node, and a lookup time-to-live value,
a transmitter, and
a processor determining if a specific entry in a directory cache includes a response term that satisfies the lookup term, wherein
if the processor determines that a specific entry includes a response term that satisfies the lookup term, the transmitter forwards the lookup message to the target node using a communication channel established using a communication address in the specific entry, or
if the processor determines that no specific entry in the directory cache includes a response term that satisfies the lookup term, the transmitter forwards the lookup message to a plurality of connected nodes with active communication connections to the intermediary node in the communication network.

10. The system of claim 9, wherein the lookup message further includes an identification value associated with a lookup operation in the communication network.

11. The system of claim 9, wherein determining that a specific entry includes a response term that satisfies the lookup term further includes determining that a time elapsed since a timestamp included in the specific entry is less than an entry time-to-live value in the directory cache.

12. The system of claim 9, wherein the lookup time-to-live value in the lookup message is decremented prior to forwarding the lookup message based on a time elapsed since receiving the lookup message.

13. The system of claim 12, wherein, if the decremented lookup time-to-live value is below or equal to zero, the lookup message is discarded instead of forwarded.

14. The system of claim 9, wherein the processor of the intermediary node inserts a new directory entry in the directory cache that includes the lookup term, the network address, and the lookup time-to-live value from the lookup message.

15. The system of claim 9, wherein, if the processor determines that no specific entry in the directory cache includes a response term that satisfies the lookup term,
the processor of the intermediary node generates a response value,
the processor of the intermediary node determines that the response value satisfies the lookup term, and
the transmitter of the intermediary node transmits a response message to the originating node, where the response message includes the response value and an intermediary address associated with the intermediary node in the communication network.

16. The system of claim 9, wherein
the lookup message further includes a data value,
the response value is generated via hashing the data value using a predetermined key, and
the response value satisfies the lookup term by being equivalent to the lookup term.

* * * * *